(12) United States Patent
Brown

(10) Patent No.: US 8,381,510 B2
(45) Date of Patent: Feb. 26, 2013

(54) METHOD AND SYSTEMS FOR CONTROLLING ENGINE THRUST USING VARIABLE TRIM

(75) Inventor: Harold Brown, Mason, OH (US)

(73) Assignee: General Electric Company, Schenectady, NY (US)

( * ) Notice: Subject to any disclaimer, the term of this patent is extended or adjusted under 35 U.S.C. 154(b) by 966 days.

(21) Appl. No.: 12/433,545

(22) Filed: Apr. 30, 2009

(65) Prior Publication Data

US 2010/0275575 A1 Nov. 4, 2010

(51) Int. Cl.
*F02K 3/00* (2006.01)
*F02K 1/16* (2006.01)
*F02K 1/18* (2006.01)
*F02C 9/00* (2006.01)

(52) U.S. Cl. ............... 60/233; 60/238; 60/239; 60/793

(58) Field of Classification Search ............... 60/233, 60/238, 239, 793, 204
See application file for complete search history.

(56) References Cited

U.S. PATENT DOCUMENTS

| | | | | |
|---|---|---|---|---|
| 3,854,287 A * | 12/1974 | Rembold | ............... | 60/236 |
| 4,136,517 A | 1/1979 | Brown | | |
| 4,313,167 A * | 1/1982 | Brown | ............... | 701/100 |
| 4,437,303 A * | 3/1984 | Cantwell | ............... | 60/39.281 |
| 5,044,155 A * | 9/1991 | Zimmerman | ............... | 60/224 |
| 5,048,285 A * | 9/1991 | Schmitt et al. | ............... | 60/204 |
| 5,050,081 A | 9/1991 | Abbott et al. | | |
| 5,129,221 A * | 7/1992 | Walker et al. | ............... | 60/778 |
| 5,142,860 A * | 9/1992 | Strange et al. | ............... | 60/39.281 |
| 5,442,909 A * | 8/1995 | Snow et al. | ............... | 60/204 |
| 6,487,490 B1 * | 11/2002 | Kamath et al. | ............... | 701/100 |
| 6,886,786 B1 | 5/2005 | Huynh | | |

* cited by examiner

*Primary Examiner* — William H Rodriguez
*Assistant Examiner* — Carlos A Rivera
(74) *Attorney, Agent, or Firm* — General Electric Company; Matthew P. Hayden; David J. Clement

(57) ABSTRACT

A method and systems for controlling a thrust output of a gas turbine engine are provided. The system includes a first sensor for measuring a first engine operating parameter, a second sensor for measuring a first engine condition parameter, and a processor programmed to determine an expected value of the first engine condition parameter and determine a first variance value using a difference between the expected value of the first engine condition parameter and the measured first engine condition parameter. The processor is further programmed to determine a trim value using the first variance value and a first engine operating parameter demand and to determine a modified operating parameter demand based on the nominal operating parameter demand and the determined trim value. The system also includes a controller coupled to the processor for controlling engine thrust based on the modified demand of the first engine operating parameter.

14 Claims, 3 Drawing Sheets

METHOD AND SYSTEMS FOR CONTROLLING ENGINE THRUST USING VARIABLE TRIM

STATEMENT REGARDING FEDERALLY SPONSORED RESEARCH & DEVELOPMENT

The U.S. Government has certain rights in this disclosure as provided for by the terms of Government Contract N00019-04-C-0093.

BACKGROUND OF THE INVENTION

The field of the invention relates generally to gas turbine engines and, more particularly, to a method and systems for automatically controlling the thrust output of a gas turbine engine to compensate for engine deterioration that may occur over time.

In at least some known jet engines, manufacturing and assembly tolerances produce variations in the flow and efficiency characteristics of the major engine components and produce variations in pressure drops and parasitic flows through the engine. These variations produce significant variations in the engine's output thrust and in its operating temperatures. Additional changes in engine thrust and operating temperatures may occur over the operating life of the engine as engine components deteriorate during in-service use. These variations are accommodated in the design process by selecting a primary control mode which is least sensitive to the expected component variations and incorporating sufficient temperature margin into the design process so that a fully deteriorated engine can be operated at required thrust levels.

The engine red-line temperature is determined from the average engine temperatures and the incorporated temperature margin. Engines which reach or exceed red-line temperature are removed from service for repair or refurbishment. Turbine cooling requirements are determined from the red-line temperature. Because minimum thrust engines operate with relatively cooler temperatures and maximum thrust engines operate relatively higher in temperature, reducing operating temperatures may be accomplished without affecting the thrust of the minimum thrust engines.

Tolerances in the design and manufacture of gas turbine engines and control system variations will create variations in operating characteristics from engine to engine within an engine model. The engines are operated according to predetermined engine model control schedules which are derived from average engine component characteristics. Un-deteriorated engines or engines with high quality components will generally run cooler and produce less thrust than average. Excess thrust levels, with accompanying higher operating temperatures, will result from lower quality components and increasing deterioration. Over time, continued operation at higher than average operating temperatures may cause components to deteriorate more rapidly and decrease the operating life of the engine.

At least some known gas turbine engines use a control architecture that is designed to enable the 'minimum' or 'worst case' engine to produce the required thrust at the target thrust setting parameter (such as fan speed). These schedules are derived from average engine performance and are then biased to meet, or exceed, required levels of thrust for all expected levels of component quality or deterioration.

It has not been possible to tailor the nominal control schedules on an engine-by-engine basis in a cost effective or reliable manner. As a result, the use of a thrust setting schedule based on the 'minimum' or "worst case" engine performance generally produces a large population of engines with excess thrust.

BRIEF SUMMARY OF THE INVENTION

In one aspect, a system for controlling a thrust output of a gas turbine engine includes a first sensor for measuring a first engine operating parameter, a second sensor for measuring a first engine condition parameter, and a processor programmed to determine an expected value of the first engine condition parameter and determine a first variance value using a difference between the expected value of the first engine condition parameter and the measured first engine condition parameter. The processor is further programmed to determine a trim value using the first variance value and a first engine operating parameter demand and to determine a modified operating parameter demand based on the nominal operating parameter demand and the determined trim value. The system also includes a controller coupled to the processor for controlling engine thrust based on the modified demand of the first engine operating parameter.

In another aspect, a method of automatically controlling a thrust output of a gas turbine engine includes determining an expected value of the second engine parameter wherein the expected value is a value expected for an engine operating at current operating conditions, determining a difference between the expected value and the second engine parameter, determining an engine trim value using the difference, modifying a current demand of the first engine parameter using the engine trim value, and controlling the thrust output of the gas turbine engine using the modified current demand.

In a further aspect, a gas turbine engine includes a fan and a thrust control system that includes a first sensor operatively coupled to the gas turbine engine wherein the first sensor is configured to measure a first engine parameter. The thrust control system also includes a second sensor operatively coupled to the engine wherein the second sensor is configured to measure a second engine parameter. The thrust control system further includes a processor communicatively coupled to the first sensor and the second sensor. The processor is programmed to determine an expected value of the second engine parameter using the first engine parameter, generate a variance value using a difference between the expected value and the second engine parameter, generate a trim value using the variance value, and modify a current demand of the first engine parameter by the trim value. The thrust control system also includes a controller communicatively coupled to the processor and the gas turbine engine. The controller is configured to control engine thrust using the modified current demand and the first operating parameter.

DETAILED DESCRIPTION OF THE INVENTION

Reducing the operating temperatures of a deteriorating engine may be accomplished without affecting the thrust of the minimum thrust engines using a variable trim process which down-trims relatively hot operating engines thereby reducing operating temperatures while not down-trimming relatively cooler engines.

Figure 1:
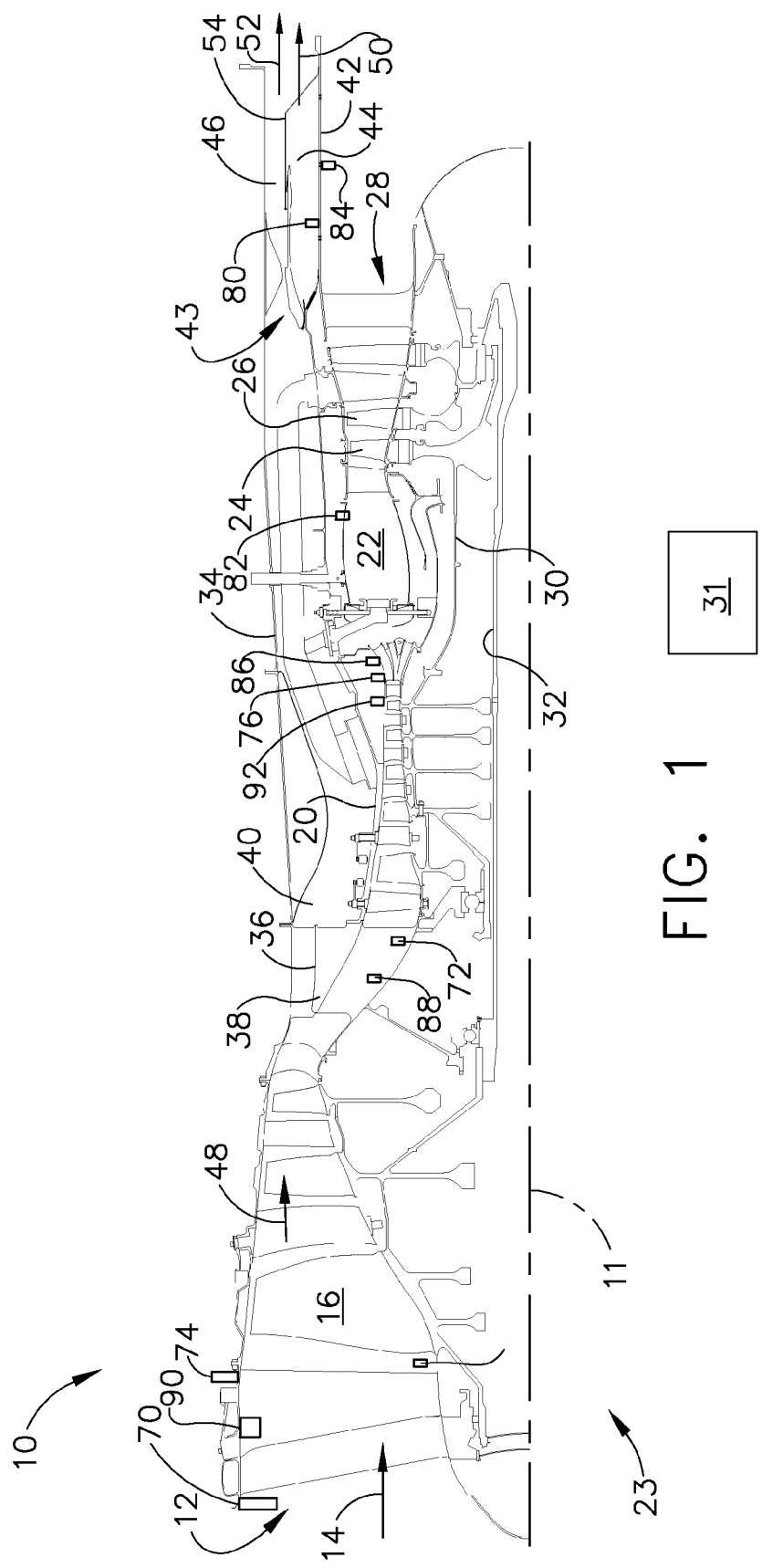
FIG. 1 is a schematic illustration of an exemplary gas turbine engine assembly.

FIG. 1 is a schematic illustration of an exemplary variable cycle turbine engine 10 having a longitudinal centerline 11. Turbine engine 10 includes an annular inlet 12 for receiving ambient air 14 followed in axial flow relationship by a fan assembly 16, a high pressure compressor (HPC) 20, a combustor 22, a high pressure turbine (HPT) 24, a low pressure turbine (LPT) 26 and an augmentor 28. The HPT 24 powers the HPC 20 through a first shaft 30. LPT 26 powers the fan assembly 16 by a second shaft 32. Engine 10 further includes an outer casing 34 which is spaced from an inner casing 36 including a forward section 38 of inner casing 36 defining a bypass duct 40. In the exemplary embodiment, augmentor 28 includes a diffuser liner 42.

In the exemplary embodiment, turbine engine 10 also includes at least one slide valve assembly 43 coupled within bypass duct 40. Specifically, engine 10 includes a plurality of valve assemblies positioned circumferentially within duct 40. More specifically, valve assembly 43 is positioned to facilitate separating bypass duct 40 into a radially inner bypass duct 44 and a radially outer bypass duct 46. Moreover, in the exemplary embodiment, fan bypass air 48 entering bypass duct 40 is divided into an inner air flow 50 and an outer air flow 52. In the exemplary embodiment, valve assembly 43 facilitates regulating the amount of inner air flow 50 that is channeled through inner bypass duct 44 and the amount of outer air flow 52 that is channeled through outer bypass duct 46. In the exemplary embodiment, a separation liner 54 contacts a tail portion of valve assembly 43 and extends to diffuser liner 42 to facilitate channeling inner air flow 50 through inner bypass duct 44.

A plurality of sensors 23 are coupled within engine assembly 10 to monitor engine operation and input real-time actual engine sensor data during engine operation to a gas turbine engine controller 31. In one embodiment, plurality of sensors 23 monitor engine rotor speeds, engine temperatures, and engine pressures, for example. Ambient flight condition data may also input to gas turbine engine controller 31. As used herein, ambient flight condition data input may include, but is not limited to only including, ambient temperature, ambient pressure, aircraft mach number, and/or engine power setting parameters, such as fan speed or engine pressure ratio. Exemplary sensor locations include, but are not limited to only including, a fan inlet temperature sensor 70, a compressor inlet total pressure sensor 72, a fan discharge static pressure sensor 74, a compressor discharge static pressure sensor 76, an exhaust liner static pressure sensor 80, a flame detector 82, an exhaust gas temperature sensor 84, a compressor discharge temperature sensor 86, a compressor inlet temperature sensor 88, a fan speed sensor 90, and a core speed sensor 92.

In the exemplary embodiment, plurality of sensors 23 may be communicatively coupled to gas turbine engine controller 31 using hard wire conduits (not shown in FIG. 1) or wireless communications. At least some of plurality of sensors 23 may be "virtual sensors". As used herein, "virtual sensors" are software constructs that receive input from one or more physical sensors and use such inputs to compute a process parameter at a location of the virtual sensor where a physical sensor for that parameter does not exist, is not practical, or has failed. For example, a T41 temperature located at an inlet to high pressure turbine 24 is subjected to the highest temperatures in gas turbine engine assembly 10. Such parameters may be measured using virtual sensors, in which other sensed parameters are used with process models of gas turbine engine assembly 10 to determine the process parameter value at a location such as T41, where the environment may be too harsh to measure directly. Upstream and downstream temperatures may be used with, for example, a physics based model, a regression based model or another model of gas turbine engine assembly 10 to determine a T41 temperature in real-time.

Figure 2:
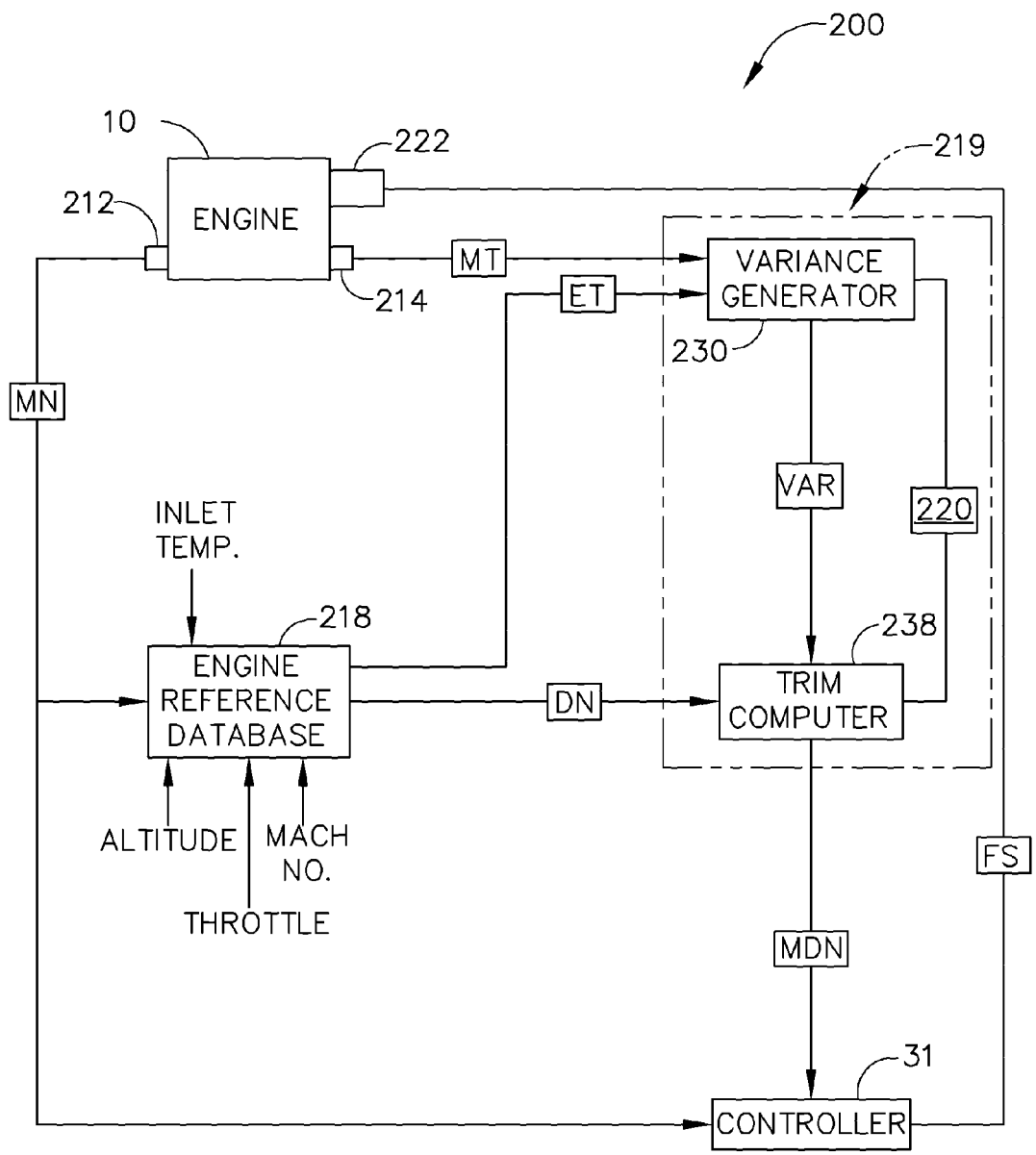
FIG. 2 is a schematic block diagram of a single closed-loop of an exemplary closed-loop control system that may be used to incorporate the Variable Trim Mode into the control system of the gas turbine engine assembly shown in FIG. 1.

FIG. 2 is a schematic block diagram of a single closed-loop of an exemplary closed-loop control system 200 that may be used to incorporate the Variable Trim Mode into the control system of gas turbine engine assembly 10 (shown in FIG. 1). In the exemplary embodiment, closed-loop control system 200 includes plurality of sensors 23 (shown in FIG. 1), such as sensors 212 and 214, for use in sensing operating parameters within gas turbine engine assembly 10 that are indicative of actual engine operation. While a number of operating parameters may be indicative of actual engine operating conditions of gas turbine engine assembly 10, for the purpose of this description and by way of example only, a measured engine temperature (MT), such as a low pressure turbine inlet temperature or a low pressure turbine discharge temperature, has been used as the basis of an exemplary indication of engine deterioration, and fan speed (MN) has been used as the exemplary parameter to be adjusted or down-trimmed. In other embodiments, other parameters, such as, but not limited to, a high pressure turbine inlet temperature or an exhaust gas temperature, may form the basis of an engine deterioration indication, and other parameters, such as, but not limited to, a core engine pressure ratio or a liner engine pressure ratio, may be used as the parameter to be adjusted.

In the exemplary embodiment, sensor 212 generates a fan speed signal (MN) that is representative of actual fan speed. Fan speed signal (MN) is transmitted from sensor 212 to an engine reference database 218 and to gas turbine engine controller 31. Engine reference database 218 may be an integral portion of a computer 219 or may be communicatively coupled to a processor 220. In the exemplary embodiment, computer 219 includes a variance generator 230 and a trim computer 238. Other engine operating parameters such as, but not limited to, altitude, throttle position, Mach number, and turbine and/or compressor inlet temperature values are also used with engine reference database 218 to determine an expected engine temperature signal (ET). Expected engine temperature (ET) represents the expected value for a physical or virtual sensor location for a nominal engine operating at the current operating conditions.

Expected engine temperature signal (ET) and a measured engine temperature (MT) from sensor 214 are transmitted to variance generator 230. Measured engine temperature (MT) may also be an estimated value based on others of the plurality of sensors 23. For example, a T5 temperature may be an estimated or virtually sensed parameter because of the harsh environment at the T5 location. Variance generator 230 compares expected engine temperature (ET) to measured engine temperature (MT) to generate a temperature difference signal (TD) that represents an estimate of current engine health. Temperature difference signal (TD) is subsequently transmitted to trim computer 238.

Trim computer 238 also receives a nominal fan speed demand signal (DN) determined using engine reference database 218. Trim computer 238 uses temperature difference signal (TD) to determine corresponding fan speed adjustments. Based on the determined fan speed adjustments, a trim mode is selected. A trim mode is selected from the temperature difference signal. The trim mode is selected to minimize the operating temperature while meeting the required thrust. If the temperature difference signal is negative, no adjustments are determined necessary and a no-trim mode is selected. If the temperature difference signal is positive but less than a pre-determined amount, a fixed trim will be selected. If the temperature difference signal is greater than the pre-determined amount, the variable trim mode will be selected to minimize the operating temperature while meeting thrust.

In the exemplary embodiment, when adjustments are determined, the nominal fan speed demand signal (DN) is then modified based on the fan speed adjustments and a modified demand signal (MDN) is transmitted to gas turbine engine controller 31. Gas turbine engine controller 31 receives the modified fan speed demand signal (MDN) from trim computer 238 and the actual fan speed (MN) from sensor 212. A determination of the difference between the modified fan speed demand signal (MDN) and the actual fan speed (MN) is used to determine a fuel supply (FS) signal, that is then transmitted to a fuel metering valve 222 associated with gas turbine engine assembly 10.

As described above, the variable trim mode (VTM) uses a hot-section temperature, either measured or estimated, to provide an indication of current engine quality and deterioration. This temperature is compared with the temperature expected from a nominal engine operating at the same conditions. The difference between the two temperatures is used to determine the appropriate level of down-trim. The down-trim is then implemented by a change in the control demand of one, or more, of the engine control loops. VTM can be implemented on the engine using either the fan speed demand or Core Engine Pressure Ratio (CEPR) demand and requires no change in control laws or control dynamics.

In various embodiments, LP turbine discharge temperature (T5) is used for the measureable hot section temperature to be used as the indicator of current quality and deterioration. If it is not being measured, an estimated T495 may be used. T5 and T495 are strongly correlated with both thrust and T41.

An engine operating regime can be divided into three zones:

Zone 1—ΔT5 is negative

Zone 2—ΔT5 is positive but less than DTF, which represents the ΔT5 value at which minimum thrust occurs on a fully deteriorated engine Zone 3—ΔT5 is greater than DTF, but less than DTT, which represents the maximum ΔT5, where ΔT5 represents a difference between the Actual T5 and the Nominal T5, DTF is the pre-determined ΔT5 at which Zone 3 starts, and DTT is the maximum expected value of ΔT5.

No trim is necessary in Zone 1. Engines operating in Zone 1 operate colder than nominal and exceed the minimum required thrust.

A fixed trim is added when the engine operates in Zone 2 to reduce the thrust at DTF to the minimum required. The fixed trim substantially eliminates the thrust increase due to deterioration and decreases maximum thrust and also decreases maximum T41 temperature.

A variable trim is added when the engine operates in Zone 3 to maintain minimum thrust at the minimum required level. The variable trim further reduces the maximum T41 variation.

In the exemplary embodiment, variable trim data has been determined for the following conditions:

Sea Level Static Hot Day Operation
0.91 M/Sea Level Hot Day Operation
0.38 M/10,000 ft Standard Day Operation
0.88 M/42,850 ft. Standard Day Operation The required trim factor (k) variation for each of the above operating conditions for Zones 2 and 3 may be determined and displayed in for example, graphical or tabular format or transmitted for further processing to control the engine. The trim factor represents the amount of CEPR down-trim required to achieve the net thrust and T41 reductions possible with VTM. Trim factor is defined as the ratio of % CEPR Trim/% T5 Variation (with respect to a Nominal Engine). The minimum trim level represents the fixed trim to be used for Zone 2 where the T5 variation is positive but below DTF. In Zone 3, where the T5 variation is between DTF and DTT, the trim factor varies with the T5 Variation in order to realize the full benefits of VTM. T5 Variations greater than DTT should not occur unless one, or more, of the component performance factors are beyond their anticipated variations. The trim factor schedule, DTF, and DTT need to be scheduled against flight Mach (or T2 and altitude (or P2).

Variable Trim Mode (VTM) provides reductions in T41 Margin requirements during the wing-borne mode of operation for an aircraft such as the Joint Strike Fighter that has a short take off or landing (STOL) mode and a wing borne mode of operation. Variable Trim Mode (VTM) provides also facilitates providing similar percentage reductions for other military and commercial engines. These reductions can be used to increase thrust ratings, improve engine operating life, reduce cooling requirements and improve specific fuel consumption, or a combination thereof.

Figure 3:
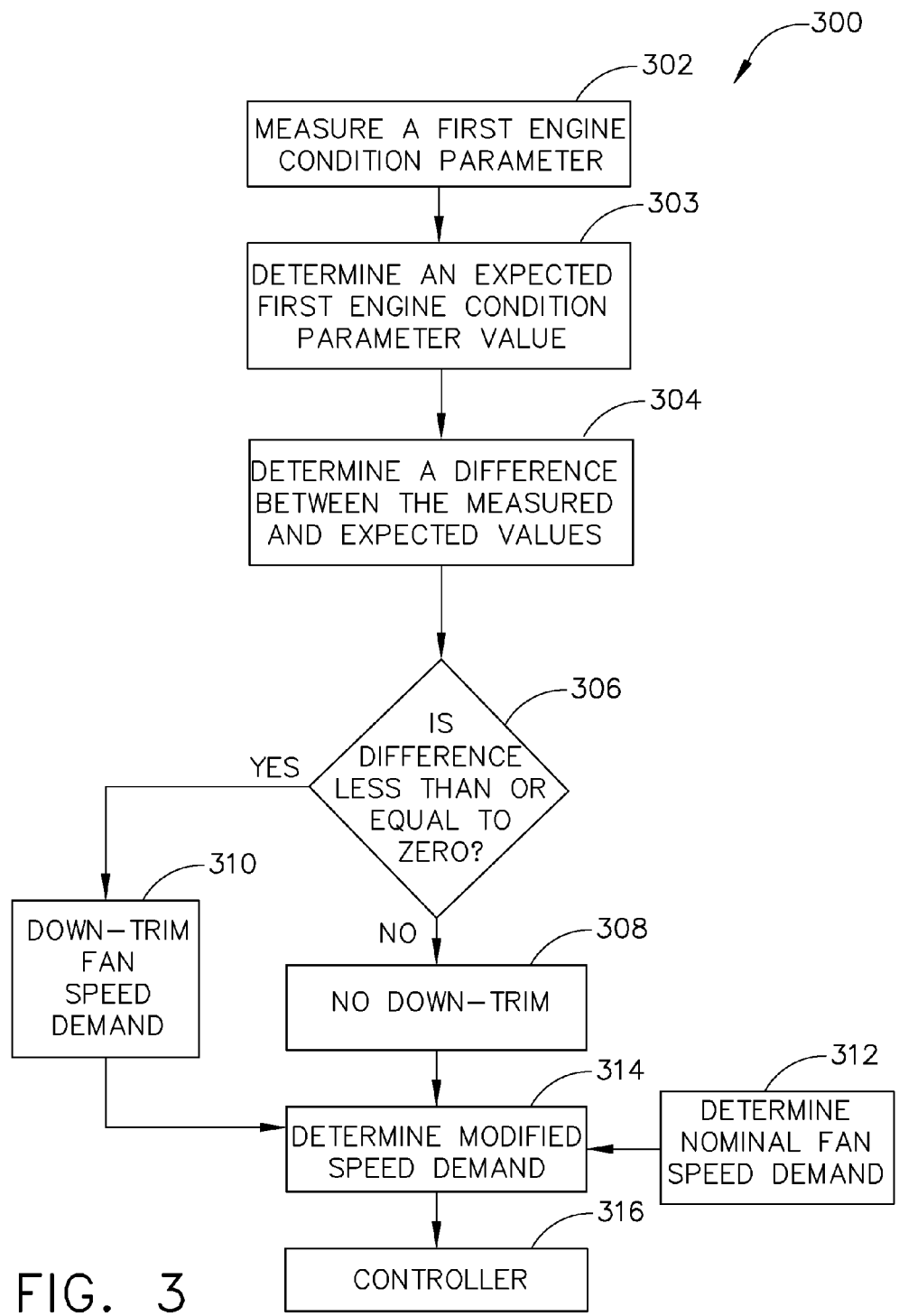
FIG. 3 is a block diagram of an exemplary method for automatically controlling a thrust output of a gas turbine engine to compensate for engine deterioration.

FIG. 3 is a block diagram of a method 300 of automatic control of the thrust output of a gas turbine engine in accordance with an exemplary embodiment of the present invention. More specifically, method 300 may be implemented using system 200 (shown in FIG. 2), for example, to compensate for engine deterioration in an associated gas turbine engine assembly, such as engine assembly 10 (shown in FIGS. 1 and 2), for example. In the exemplary embodiment, method 300 includes measuring 302 a first engine condition parameter. For example, in the exemplary embodiment, the first engine condition parameter is a parameter whose change in value from nominal operating conditions is indicative of deterioration of the associated gas turbine engine. In other embodiments, other values, such as high pressure turbine inlet temperature, low pressure turbine inlet temperature, or exhaust gas temperature may be used for comparison. Method 300 includes determining 303 an expected first engine condition parameter value.

The difference between the measured first engine condition parameter and the expected value is then determined 304, and a trim mode is selected 306 based on the difference. If the determined difference is less than or equal to zero, the engine is operating at a cooler temperature than a representative engine that has not experienced deterioration. For an engine determined 308 to be operating cooler than expected, no down-trim is deemed necessary. If the determined difference is greater than zero, a determination 310 is made that a down-trim demand is necessary. The down-trim demand is determined using other engine operating parameters, such as, for example altitude, throttle position, Mach number, and fan inlet temperature. In the exemplary embodiment, the selected closed-loop controlled parameter to be adjusted or down-trimmed is fan speed, but could be any other closed-loop control parameter, such as core engine pressure ratio, or liner engine pressure ratio, for example. A nominal fan speed demand is determined 312 using the other engine operating parameters, such as, for example altitude, throttle position, Mach number, and fan inlet temperature. A modified speed demand 314 is determined from the nominal fan speed demand and the down-trim speed demand, and this modified demand is transmitted 316 to the gas turbine engine controller 31.

Exemplary embodiments of methods and systems for use in controlling engine thrust using a variable trim mode are described above in detail. The systems and methods are not limited to the specific embodiments described herein, but rather, components of the systems and/or steps of the method may be utilized independently and separately from other components and/or steps described herein. Moreover, the described system components and/or the methodology defined herein, or used in combination with, other systems and/or other methods, and are not limited to practice with only the system and/or methods described herein.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. As used herein, the terms "software" and "firmware" are interchangeable, and include any computer program stored in memory for execution, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof. In one embodiment, the technical effect is a method for use in controlling the thrust output of a gas turbine engine, wherein the methodology accounts for any deterioration of the associated gas turbine engine that has occurred. Any such resulting program, having computer-readable code means, may be embodied or provided within one or more computer-readable media, thereby making a computer program product, i.e., an article of manufacture, according to the exemplary embodiments described herein. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A thrust control system for use in controlling the thrust output of a gas turbine engine, said thrust control system comprising:
    a first sensor for measuring a first engine operating parameter, wherein the first engine operating parameter is indicative of engine operation, and wherein said first engine operating parameter is at least one of a fan speed, a core engine pressure ratio, and a liner engine pressure ratio;
    a second sensor for measuring a first engine condition parameter, wherein the first engine condition parameter is a parameter whose change in value from a nominal value is indicative of deterioration of the gas turbine engine, and wherein said first engine condition parameter is at least one of a low pressure turbine discharge temperature, a high pressure rotor inlet temperature, a low pressure turbine rotor inlet temperature, and an exhaust gas temperature;
    a processor programmed to:
        determine an expected value of the first engine condition parameter using the measured first engine operating parameter value;
        determine a first variance value, using a difference between the expected value of the first engine condition parameter and the measured first engine condition parameter;
        determine a trim value for controlling the first engine operating parameter using the first variance value and a first engine operating parameter demand;
        determine a modified operating parameter demand based on a nominal operating parameter demand and the determined trim value; and
    an electric controller coupled to said processor for receiving the determined modified operating parameter demand value from the processor and first engine operating parameter value from the first sensor, said electric controller configured to control engine thrust based on a determined difference between the determined modified operating parameter demand of the first engine operating parameter and the first engine operating parameter value from the first sensor.

2. A system in accordance with claim 1 wherein said processor is further programmed to use a lookup table that provides the expected value of the first engine condition parameter using at least one of altitude, Mach number, inlet temperature, and power setting.

3. A system in accordance with claim 2 wherein said lookup table comprises data generated by at least one of empirical testing the same type of gas turbine engine as the gas turbine engine coupled to said system and a computer model based on the same type of gas turbine engine coupled to said system.

4. A system in accordance with claim 2 wherein said lookup table further comprises a table of expected engine temperature values as a function of the fan speed, and at least one of an altitude, a Mach number, an engine inlet temperature, and a throttle setting.

5. A system in accordance with claim 1 wherein said electric controller is configured to control the engine thrust using at least one of a core engine pressure ratio (CEPR), a fan speed value, and a liner engine pressure ratio.

6. A method of automatically controlling a thrust output of a gas turbine engine, said method comprising:
    measuring a first engine parameter indicative of engine operation, and wherein measuring said first engine parameter comprises measuring at least one of an engine fan speed, an engine pressure ratio, and a liner engine pressure ratio;
    measuring a second engine parameter whose change in value from a nominal value is indicative of deterioration of the gas turbine engine, and wherein measuring said second engine parameter comprises measuring at least one of a low pressure turbine discharge temperature, a high pressure rotor inlet temperature, a low pressure turbine rotor inlet temperature, and an exhaust gas temperature;

determining an expected value of the second engine parameter using the measured first engine parameter, and wherein the expected value is a value expected for an engine operating at current operating conditions;

determining a difference between the expected value and the second engine parameter;

determining an engine trim value using the difference;

modifying a current demand of the first engine parameter using the determined engine trim value; and using an electric controller for controlling the thrust output of the gas turbine engine based on the modified current demand and the first engine parameter.

7. A method in accordance with claim 6, wherein determining the expected value comprises determining the expected value of the second engine parameter using an engine performance database.

8. A method in accordance with claim 7, further comprising accessing an onboard engine performance database comprising data generated by testing an engine of the same type as the gas turbine engine.

9. A method in accordance with claim 6, wherein determining the engine trim value further comprises:
classifying a level of engine deterioration based on the difference;
determining a change in the operating parameter demand based on the engine deterioration classification.

10. A method in accordance with claim 6, wherein controlling the thrust output further comprises changing one of a fan speed and a core engine pressure ratio by an amount equivalent to the trim value.

11. A gas turbine engine system comprising:
a fan; and
a thrust control system comprising;
a first sensor operatively coupled to the gas turbine engine, said first sensor configured to measure a first engine parameter, wherein the first engine parameter is indicative of engine operation and comprises at least one of a fan speed and a core engine pressure ratio (CEPR);
a second sensor operatively coupled to the engine, said second sensor configured to measure a second engine parameter, wherein the second engine parameter is a parameter whose change in value from a nominal value is indicative of deterioration of the gas turbine engine and comprises at least one of a low pressure turbine discharge temperature, a high pressure rotor inlet temperature, a low pressure turbine rotor inlet temperature, and an exhaust gas temperature;
a processor communicatively coupled to the first sensor and the second sensor, said processor programmed to determine an expected value of the second engine parameter using the first engine parameter, said processor further programmed to:
generate a variance value using a difference between the expected value and the second engine parameter;
generate a trim value using the variance value; and
modify a current demand of the first engine parameter by the trim value; and
an electric controller communicatively coupled to the processor for receiving the modified current demand from the processor and to the gas turbine engine for receiving the first engine parameter from the first sensor, said electric controller configured to control engine thrust using a difference between the modified current demand of the first engine parameter and the first engine parameter from the first sensor.

12. A system in accordance with claim 11 wherein the electric controller changes the amount of engine thrust by changing at least one of a core engine pressure ratio (CEPR) and a fan speed.

13. A system in accordance with claim 11 further comprising a memory device comprising a look-up table of expected temperature values versus fan speeds and at least one of altitudes, Mach numbers, and inlet temperatures.

14. A system in accordance with claim 13 wherein said look-up table comprises data generated by at least one of computer modeling an engine of the same type as the gas turbine engine and testing an engine of the same type as the gas turbine engine.

* * * * *